(12) United States Patent
Ambrosini et al.

(10) Patent No.: US 10,107,268 B1
(45) Date of Patent: Oct. 23, 2018

(54) THERMAL ENERGY STORAGE AND POWER GENERATION SYSTEMS AND METHODS

(71) Applicant: National Technology & Engineering Solutions of Sandia, LLC, Albuquerque, NM (US)

(72) Inventors: Andrea Ambrosini, Albuquerque, NM (US); James E. Miller, Albuquerque, NM (US); David D. Gill, Bellingham, WA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 406 days.

(21) Appl. No.: 14/846,201

(22) Filed: Sep. 4, 2015

Related U.S. Application Data

(60) Provisional application No. 62/046,725, filed on Sep. 5, 2014.

(51) Int. Cl.
*F03G 6/00* (2006.01)

(52) U.S. Cl.
CPC .................... *F03G 6/003* (2013.01)

(58) Field of Classification Search
CPC . F24J 2/0477; F24J 2/10; F24J 2/4649; C10K 3/026; C01B 3/06; C01B 3/0005; C10L 1/04; C10L 3/08; C10G 2/32; C25B 1/04
See application file for complete search history.

(56) References Cited

U.S. PATENT DOCUMENTS

| | | | | | |
|---|---|---|---|---|---|
| 4,702,971 | A | * | 10/1987 | Isenberg | C25B 9/08 429/482 |
| 5,961,690 | A | * | 10/1999 | Kepplinger | C21B 13/002 266/156 |
| 6,482,351 | B2 | * | 11/2002 | Kamikawa | C21B 13/105 266/156 |
| 8,522,573 | B2 | * | 9/2013 | Golben | C10L 1/04 422/129 |
| 9,346,013 | B2 | * | 5/2016 | Moghtaderi | C01B 13/08 |
| 9,586,190 | B1 | * | 3/2017 | Ermanoski | B01J 19/127 |
| 2003/0210931 | A1 | * | 11/2003 | Haraguchi | G03G 15/0844 399/281 |
| 2009/0308757 | A1 | * | 12/2009 | Crettenand | C25B 9/162 205/334 |
| 2012/0237440 | A1 | * | 9/2012 | Kodama | C01B 3/061 423/658 |

(Continued)

*Primary Examiner* — Mark Laurenzi
*Assistant Examiner* — Shafiq Mian
(74) *Attorney, Agent, or Firm* — Daniel J. Jenkins

(57) ABSTRACT

A solar power system and materials capable of storing heat energy by thermochemical energy storage are disclosed. Thermal energy is stored as chemical potential in these materials through a reversible reduction-oxidation reaction. Thermal energy from concentrated sunlight drives a highly endothermic reduction reaction that liberates lattice oxygen from the oxide to form $O_2$ gas, leaving energy-rich, oxygen-depleted particles. When desired, the heat is recovered as the particles are re-oxidized in an exothermic reaction upon exposure to air. The system may be integrated with a power generation system to generate power.

16 Claims, 1 Drawing Sheet

(56) References Cited

U.S. PATENT DOCUMENTS

| | | | |
|---|---|---|---|
| 2013/0181169 A1* | 7/2013 | Klein | B01J 12/007 252/373 |
| 2014/0102912 A1* | 4/2014 | Palumbo | C01B 3/063 205/340 |
| 2014/0130415 A1* | 5/2014 | Chan | C10K 3/026 48/61 |
| 2015/0253039 A1* | 9/2015 | Erickson | F24J 1/00 126/714 |
| 2016/0332151 A1* | 11/2016 | Li | C01B 3/26 |

* cited by examiner

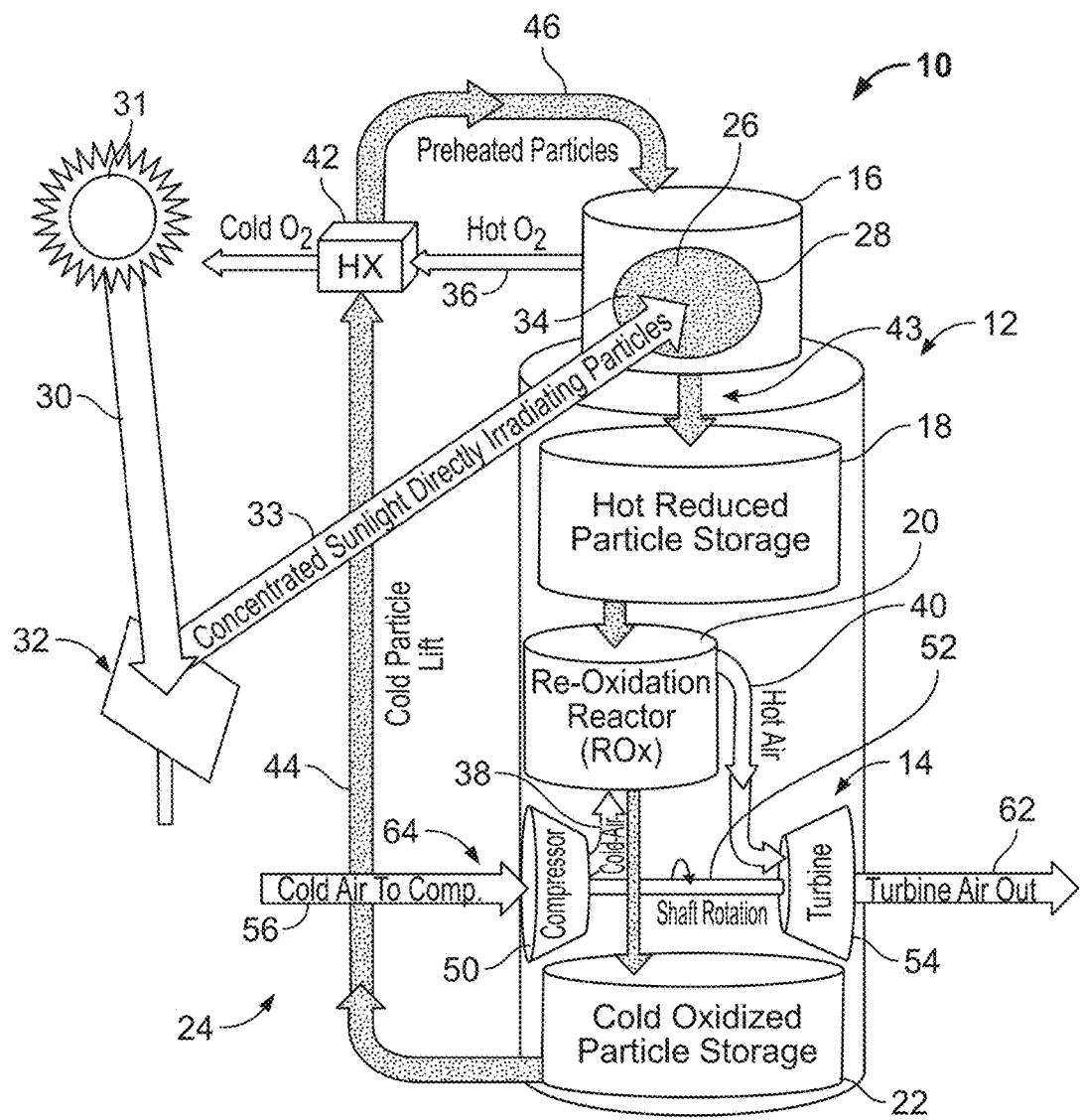

THERMAL ENERGY STORAGE AND POWER GENERATION SYSTEMS AND METHODS

RELATED APPLICATION

This application claims priority to U.S. Provisional Patent Application No. 62/046,725, filed on Sep. 5, 2014, and entitled "REDOX-ACTIVE OXIDE MATERIALS FOR THERMAL ENERGY STORAGE", the entirety of which is incorporated herein by reference.

GOVERNMENT RIGHTS

The Government has rights to this invention pursuant to Contract No. DE-AC04-94AL85000 awarded by the U.S. Department of Energy.

FIELD

The invention relates generally to energy storage and generation, and more particularly to energy storage and generation systems and methods using thermochemically active materials to capture, store, and release solar energy thermochemically.

BACKGROUND OF THE INVENTION

The desire to decrease and ultimately eliminate dependence on fossil fuels has stimulated research into clean and renewable ways to produce electricity for the global marketplace. Solar power is a viable option to fulfill this goal because it is a clean, carbon-free form of energy production, and there is a potentially limitless supply of solar radiation.

Technological innovations and improvements have helped to make solar power generation a feasible means for large scale power production. More specifically, the reduction in the magnitude of capital investment required and the reduction in recurring operation and maintenance costs allow solar power generation to compete with other forms of power generation.

To address the demand for solar power systems, many configurations have been designed and implemented. One such implementation is a concentrating solar power system that collects and concentrates solar energy onto an absorber wherein it is converted to heat. A thermal carrier, for example a fluid such as an oil or molten salt, can be used to transport the heat, for example by pumping, to a power conversion system. The power conversion system utilizes the heat to produce electricity that can be fed into an electrical grid or other system. The thermal carrier is cycled indefinitely between the absorber and the power conversion system.

A significant impediment to wide-spread implementation of solar power systems is the transient nature of solar energy and the temporal mismatch between peak solar flux and consumer power demands. Accordingly, a need exists for a solar power generation system with the ability to store the collected energy so that electrical energy production can be optimized to follow periods of high power demand. Advanced concentrating solar power systems can meet this need by oversizing the collection portion of the system relative to the power block, and providing a means to store the thermal fluid at elevated temperature, for example an insulated tank holding molten salt.

However, the current generation of heat transfer fluids is not ideal as storage media. Molten salt, the current state of the art material, and other fluids are limited to temperatures below approximately 600° C. Additionally, molten salts are corrosive and store energy only as sensible heat, resulting in a relatively low energy storage density. These attributes drive storage costs higher and are incompatible with high-efficiency, high-temperature power cycles with the potential to reduce the cost of the electricity produced, such as Brayton cycles.

SUMMARY OF THE INVENTION

According to an embodiment of the disclosure, a system and method for storing heat in the form of chemical bonds, then leveraging the thermochemical heat in addition to the sensible heat is disclosed.

According to another embodiment of the disclosure, chemical compositions are disclosed for storing heat both chemically and sensibly and utilizing it to drive a turbine to produce electricity.

According to an embodiment, a system is disclosed that includes a thermochemical energy storage system and a power generation system configured to provide input air to the re-oxidation reactor and to receive output air from the re-oxidation reactor. The thermochemical energy storage system includes a solar receiver reduction reactor, a re-oxidation reactor, and a particle transport system configured to circulate particles between the solar receiver reduction reactor and the re-oxidation reactor.

According to an embodiment, a method is disclosed that includes thermochemically reducing metal oxide particles in a reduction reactor to liberate oxygen by heating them and providing the heated particles to a re-oxidation reactor where the heated particles are exposed to a gas stream comprising an oxygen-containing gas thereby re-oxidizing the particles in an exothermic reaction and transferring the heat of reaction to the gas stream to form a heated gas stream, and providing the heated gas stream to a power generation system.

An object of the present invention is to provide a cost efficient and effective method to produce electricity from collected solar energy.

Another object of the present invention is to recuperate heat recovered from chemical and sensible potential at temperatures significantly higher than those currently used in solar thermal electricity production and therefore well-suited to more efficient, higher temperature power cycles, such as in a supercritical carbon dioxide or air Brayton cycle power generator.

Another object of the present invention is to utilize the exothermic nature of the chemical energy discharge process to heat the working fluid, allowing storage at lower temperatures than are achieved during discharge, thus facilitating storage and reducing material costs as well improving overall efficiency, for example by reducing re-radiation losses during solar charging/reduction.

Another object of the present invention is to develop a reactor system that effectively achieves the collection and storage of thermal energy at high temperatures utilizing the compositions herein, allowing for overall higher efficiencies in electricity production.

An advantage of the present invention is to increase storage density relative to sensible-only energy storage.

Another advantage of the present invention is to produce electricity at a reduced levelized cost by increasing storage density and shifting power generation to times of greater demand or to times when sunlight is unavailable.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 1 is an illustration a solar power system according to an embodiment of the disclosure.

DETAILED DESCRIPTION OF THE INVENTION

The present disclosure is directed to a solar power system capable of storing heat energy by a thermochemical energy storage system that includes thermochemically active, metal oxide particles. In an embodiment, the metal oxide particles may be mixed ionic-electronic conducting (MIEC) metal oxides. Thermal energy is stored and released as chemical potential in these materials through a reversible reduction-oxidation reaction. Thermal energy from concentrated sunlight drives a highly endothermic reduction reaction that liberates lattice oxygen from the MIEC metal oxide to form $O_2$ gas, leaving an energy-rich, oxygen-depleted solid. When desired, the heat is recovered as the MIEC is re-oxidized in an exothermic reaction by exposure to oxygen. The system may be integrated with an air Brayton power cycle to generate power. The sensible heat of the hot solid also contributes to the storage capacity and may also be transferred to the oxidizing air, for example by counter-current flow of the air and metal oxide. The storage capacity and upper temperature at which heat is recovered may be tailored to a specific application by altering the chemical composition of the metal oxide and the partial pressure of oxygen during the reduction and oxidation reactions, for example by adjusting the total pressure by means of vacuum pumping or compression.

According to an embodiment of the invention, a solar power system that includes thermochemical energy storage (TCES) to increase storage density relative to sensible-only energy storage is disclosed. Energy may be stored indefinitely in the form of chemical bonds via the TCES system and accessed upon demand. Heat recovered from combined chemical and sensible potentials from the TCES system is at temperatures significantly higher than those currently used in solar thermal electricity production and therefore well-suited to more efficient, higher temperature power cycles. All of these attributes lead to a reduction in the levelized cost of electricity produced by concentrating solar power. The system includes an innovative storage cycle based on metal oxides with mixed ionic-electronic conductivity (MIEC). Thermal energy is stored as chemical potential in these materials through a reversible reduction-oxidation reaction.

According to an embodiment of the invention, thermal energy from concentrated sunlight drives a highly endothermic reduction reaction, for example in a falling particle receiver, that liberates lattice oxygen from metal oxide particles to form $O_2$ gas, leaving a hot, energy-rich, and oxygen-depleted solid. The hot particles are stored in a controlled low oxygen concentration ($pO_2$) environment to prevent reoxidation. When desired, the heat is recovered by re-oxidizing the particles in an exothermic reaction through exposure to air or other oxygen-containing gas mixture. Both the exothermic heat and the sensible energy of the particle may be recovered. In one configuration, the storage system is highly integrated with an air Brayton power cycle. The compressor of the Brayton engine delivers low temperature compressed air to the re-oxidizer reactor. Upon exiting the reactor, the high temperature air drives the turbine of the Brayton engine. Expansion of the hot compressed air turns the turbine and generator thus efficiently producing electric power.

The MIEC metal oxide TCES process has several significant advantages over other storage processes. First, the high and realizable energy density reduces the capital cost of the thermal storage material and containment vessels, reducing operating costs. The mixed conductivity facilitates rapid kinetics and full utilization of the storage potential; i.e., the bulk (not just surface) of the material is accessible for redox chemistry. Second, chemical stability of the material further enables the process by maintaining its crystal structure as the oxygen leaves and re-enters the material, even at elevated temperatures. This bestows benefits in terms of faster kinetics and increased reliability and structural integrity. Third, the only working fluids in the system are oxygen and possibly carrier gases produced during reduction, and the air or other oxygen-containing gas used for re-oxidation and in the power cycle. That is, the storage system is minimally complex—it avoids the need to compress and store process gasses, and is inherently safe and environmentally friendly. Fourth, the properties of MIECs are highly tunable through doping and substitution, enabling adjustment of the magnitude of oxygen nonstoichiometry, as well as the oxygen uptake and release temperatures to match the highly efficient combined-cycle air Brayton engine. Finally, the entire system has been designed with an eye towards efficiency and operability. Potential losses and complexity are addressed at every process step, for example through (1) the direct solar irradiation of the particles for reduction; (2) the use of air in the re-oxidation step as both the oxygen source and the heat transfer fluid feedstock for the air Brayton engine; and (3) the recovery of heat from the produced oxygen stream from the receiver/reduction reactor—the only "waste" stream in the storage subsystem.

In the solar power system, the thermal energy recovery (discharge) temperature to the power cycle can be greater than the temperature at which the storage material is reduced (charged).

FIG. 1 illustrates an embodiment of a solar power system 10 according to the present invention. The solar power system 10 is capable of storing heat energy via a thermochemical energy storage (TCES) and release system using thermochemically active, metal oxide particles (particles) and using the stored heat energy to drive a power generation system. In an embodiment, the metal oxide particles are mixed ionic-electronic conducting (MIEC) metal oxide particles.

The solar power system 10 includes a TCES and release subsystem 12 and a power generation subsystem 14. The TCES and release subsystem 12 includes a solar receiver reduction reactor (SR3) 16, a hot reduced particle storage vessel 18, a re-oxidation reactor (ROx) 20, a cool or cold oxidized particle storage vessel 22, and a particle transport system 24. The SR3 16 includes a particle reduction chamber (chamber) 26 having an aperture or window 28 for allowing concentrated solar energy to enter the chamber. In such a manner, solar energy 30 from the sun 31 may be concentrated by a one or more heliostats or solar collection system 32, which directs reflected concentrated sunlight 33 into the chamber 26 via the window 28 to heat thermochemically active, metal oxide particles (particles) 34 contained therein. The heated particles undergo a reduction reaction that generates hot $O_2$, which is removed from the SR3 16 via a hot evolved $O_2$ flow 36. The SR3 16 operates at a temperature of between 500 and 1500° C. In an embodiment, the SR3 16 operates at temperatures between 800-1200° C. In another embodiment, the SR3 16 operates at a temperature of between 1000-1100° C.

The hot reduced particle storage vessel 18 is in fluid communication with the SR3 16 via a portion of the gravity feed section 43 (see discussion below). In such a manner, the hot reduced particle storage vessel 18 may receive heated particles discharged from the chamber 26. The hot reduced particle storage vessel 18 stores particles at a temperature of >500° C. In an embodiment, the hot reduced particle storage vessel 18 stores particles at a temperature >1000° C. In another embodiment, the hot reduced particle storage vessel 18 stores particles at a temperature of between 1000 and 1200° C. In another embodiment, the hot reduced particle storage vessel 18 may be bypassed or partially bypassed, and the particles from the SR3 16 may be provided directly to the ROx 20 or stored or some fraction of both.

In an embodiment, the hot reduced particle storage vessel 18 is configured to store particles for a period of time before providing the particles to the ROx 40. In an embodiment, the hot reduced particle storage vessel 18 is configured to store particles for a period greater than 8 hours. In an embodiment, the hot reduced particle storage vessel 18 is configured to store particles for a period greater than 24 hours. In an embodiment, the hot particle storage vessel 19 may be configured to store a portion or the entire inventory of particles within the system.

The ROx 20 is in fluid communication with the hot reduced particle storage vessel 18 via a portion of the gravity feed section 43 (see discussion below). In such a manner, the ROx 20 may receive heated particles discharged from the hot particle storage vessel 18. The ROx 20 receives cold or cooler gas (ROx input gas) 38 and discharges hot gas (discharge gas) 40. In this exemplary embodiment, the ROx input gas 38 is air, however, in other embodiments, the ROx input gas may be air, oxygen, oxygen enriched air or gas, carbon dioxide, or other gas capable of facilitating a thermochemical oxidation reaction. Air (or other fluid) flow will typically de directed in a countercurrent fashion to particle flow through the ROX to maximize heat transfer and the air outlet temperature.

The ROx input gas 38 is provided to the ROx 20 at temperatures between ambient and 600° C. In an embodiment, the ROx input gas 38 may be provided to the ROx 20 at a temperature of between 250 and 500° C. In another embodiment, the ROx input gas 38 may be provided to the ROx 20 at a temperature of between 400 and 500° C.

The discharge gas 40 is discharged from the ROx 20 at temperatures between 500 and 1500° C. In an embodiment, the discharge gas 40 may discharged from the ROx 20 at a temperature of between 1000-1250° C. In another embodiment, the discharge gas 40 may be discharged from the ROx 20 at a temperature of between 1100 and 1200° C.

The cold oxidized particle storage vessel 22 is in fluid communication with the ROx 20 via one or more conduits (not shown). In such a manner, the cold oxidized particle storage vessel 22 may receive cold particles discharged from the ROx 20. In another embodiment, the cold oxidized particle storage vessel 22 may be omitted or split into one or more streams so that particles may be stored, sent directly to the SR3 16 or some fraction of both.

In an embodiment, the cold oxidized particle storage vessel 22 is configured to store particles for a period of time before providing the particles to the ROx 40. In an embodiment, the cold oxidized particle storage vessel 22 is configured to store particles for a period greater than 8 hours. In an embodiment, the cold oxidized particle storage vessel 22 is configured to store particles for a period greater than 24 hours. In an embodiment, the cold oxidized particle storage vessel 22 may be configured to store a portion or the entire inventory of particles within the system.

In this exemplary embodiment, the solar power system 10 includes heat exchanger 42. The heat exchanger 42 is in fluid communication with the cold oxidized particle storage vessel 22 via a cold particle lift 44 that is part of the particle transport system 24. In such a manner, the heat exchanger 42 receives cold particles discharged from the cold oxidized particle storage vessel 22. The heat exchanger 42 is also in fluid communication with the hot evolved $O_2$ flow 36 discharged from the SR3 16. The hot $O_2$ exchanges heat with the cold particles which are discharged from the heat exchanger 42 as preheated particles 46, which are fed to the SR3 16. In another embodiment, heat exchanger 42 may be omitted, the particles cooled by another component of the systems, or the cold particles are fed directly to the SR3 16 or any combination thereof.

The particle transport system 24 includes a gravity feed section 43 (indicated by downward pointing arrows) and the cold particle lift 44. The gravity feed section 43 provides fluid connectivity to move particles from the bottom (hot side) of the SR3 16 to the hot reduced particle storage 18, the ROx 20, and the cold oxidized particle storage vessel 22. The gravity feed section 43 includes conduits or piping (not shown) configured to move particles. In another embodiment, the gravity feed section 43 may include, but is not limited to conduits, piping, conveyors, valves, temperature sensors, and motors configured to move particles. In another embodiment, the gravity feed section 43 may be replaced in part or in whole with a mechanical transport devices, for example screw feed mechanisms.

The cold particle lift 44 is in fluid connection with and receives cold particles from the cold oxidized particle storage vessel 22. The cold particle lift 44 transports those particles to a heat exchanger 42 where the particles are heated by the hot evolved $O_2$ flow 36 discharged from the SR3 16. Preheated particles 46 are discharged from the heat exchanger 42 and provided to the SR3 16 via a conduit (not shown). Cold $O_2$ that has lost heat to the particles is then discharged from the heat exchange 42. The cold particle lift 44 may be, but is not limited to, a screw elevator, Olds elevator, conveyor, skip hoist, or other device or mechanism capable of particle transport.

The particle transport system 24 further includes, but is not limited to, conduits, piping, conveyors, valves, temperature sensors, and motors configured to move particles and provide fluid connectivity between the components of the TCES subsystem 14.

The power generation subsystem 14 includes a compressor 50 mechanically coupled via shaft 52 to turbine 54. The compressor receives input gas 56, compresses the input gas 56, and discharges ROx input gas 38. In this exemplary embodiment, the input gas 56 is air, however, in other embodiments, the input gas 56 may be air, oxygen-enriched air or gas, carbon dioxide, or other gas capable of facilitating a thermochemical oxidation reaction. As appreciated by one of ordinary skill in the art, the ROx 20 provides and receives air from the power generation subsystem 14, and the components, including but not limited to the compressor(s), turbine(s) and other associated components and temperatures are configured and selected in a way that is known to one skilled in the art, including the possibility of internal recuperation and bottoming cycles.

The ROx input gas 38 is provided to the ROx 20 where the ROx input gas reacts with the reduced particles and generates discharge gas 40. The discharge gas 40 discharged from the ROx 20 is provided to the turbine 54 where it is expanded, driving turbine 54. Turbine gas 62 is discharged from the turbine 54. The turbine 54, connected via shaft 52, thus provides power to drive the compressor 50 to compress the turbine inlet gas 56. In other embodiments, the power generation subsystem 14 may be alternately configured, such as by using a turbine-alternator-compressor (TAC) configuration, or other compressor/turbine system as appreciated by one in the art. In an embodiment, the power generation system is part of an Air-Brayton cycle power generation unit.

In an embodiment, cold air 56 is compressed in an air Brayton compressor 50 prior to being fed to the ROx reactor 20. The cool compressed air passed counter-currently to particles fed through the ROx and is heated in the process by the sensible heat of the particles and the reaction exotherm. Because the pO2 is higher than the pO2 during reduction, it is possible for the exotherm to increase the temperature to a value greater than the reduction and storage temperature.

An air transport system 64 is employed to transport the cold air 56, compressed cold air 58, hot air 60 and turbine air 62. The air transport system 64 includes, but is not limited to conduits, piping, conveyors, valves, temperature sensors, and other fluid control devices configured to transport air and provide fluid connectivity between the components of the power generation subsystem 14 and ROx 20.

The system 10 can operate at high energy density thermal storage greater than 450 kJ/kg, which is that of currently-used molten salts. In another embodiment, the system 10 can operate at energy density thermal storage greater than 800 kJ/kg. In another embodiment, the system 10 can operate at energy density thermal storage greater than 1000 kJ/kg. In another embodiment, the system can operate at energy density thermal storage greater than 1200 kJ/kg. In another embodiment, the system can operate at energy density thermal storage greater than 1500 kJ/kg.

In the SR3 16, thermochemically active, metal oxide particles (particles) 34 capture solar energy resulting in a temperature increase (storage of thermal energy). A fraction of the capture energy is converted to stored chemical energy through an endothermic reduction reaction which can be generalized as $MO_x + \Delta H \leftrightarrow MO_{x-\delta} + \delta/2\ O_{2(g)}$ where MO represents a metal or combination of metals, x represents the oxygen stoichiometry of the oxidized form of the material, and $\delta$ represents the reduction extent of the reaction.

The SR3 can be embodied in any number of particle receiver designs, and may include features such as multi-pass particle circulation and features to increase particle residence time. The SR3 aperture may be configured in any orientation including facing up, facing down, vertical, and so forth. The aperture may be open to environment or windowed and means may be provided to manipulate the $pO_2$ including vacuum pumps or sweep gasses. The metal oxide particles may flow through the SR3 due to the forces of gravity, or mechanically or otherwise conveyed.

In the ROx 20, the particles 34 pass counter-currently to an air stream which enters as cold air 38 and exits as hot air as sensible heat is transferred and the heat of reaction is recovered as the particles are reoxidized to their original form. The reaction is generalized as $MO_{x-\delta} + \delta/2\ O_{2(g)} \leftrightarrow MO_x + \Delta H$. Conversely to the air, the particles enter the ROx hot and exit as cool particles. The particles 34 may be any MIEC oxide. In an embodiment, the particles 34 may be pure or doped perovskites, spinels, brownmillerite, or binary oxide.

In an embodiment, the particles may be mixed ionic-electronic conducting (MIEC) metal oxide material. In an embodiment, the MIEC may be a doped perovskite, $A_x A'_{1-x} B_y B'_{1-y} O_{3-\delta}$. In an embodiment, the doped perovskite may be $A_x A'_{1-x} B_y B'_{1-y} O_{3-\delta}$ where A=La, Sr, K, Ca, Ba, Y and B=Mn, Fe, Co, Ti, Ni, Cu, Zr, Al, Y, Cr, V, Nb, Mo, where x=0-1, y=0-1, and $0 \leq \delta \leq 0.5$.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system, comprising:
    a thermochemical energy storage system comprising a solar receiver reduction reactor, a re-oxidation reactor, and a particle transport system configured to circulate particles between the solar receiver reduction reactor and the re-oxidation reactor;
    a power generation system configured to provide input air to the re-oxidation reactor and to receive output air from the re-oxidation reactor; and
    a thermochemically active material circulating within the thermochemical energy storage system, the thermochemically active material being a mixed ionic-electronic conductive metal oxide.

2. The system of claim 1, further comprising:
    a reduced particle storage vessel disposed between and in particle fluid communication with the solar receiver reduction reactor and the re-oxidation reactor.

3. The system of claim 1, further comprising:
an oxidized particle storage vessel disposed between and in particle fluid communication with the re-oxidation reactor and the solar receiver reduction reactor.

4. The system of claim 1, wherein the power generation system is an air Brayton cycle power generation system.

5. The system of claim 1, wherein hot air generated in the re-oxidation reactor is provided to a turbine of the power generation system.

6. The system of claim 1, wherein the re-oxidation reactor receives input air from an air discharge of a compressor of the power generation system.

7. The system of claim 1, wherein the reduced particle storage vessel is configured to store particles for a period of time before providing the particles to the re-oxidation reactor.

8. The system of claim 1, further comprising:
a solar collection system configured to provide concentrated sunlight to the solar receiver reduction reactor.

9. A method, comprising:
chemically reducing mixed ionic-electronic conductive metal oxide particles in a reduction reactor to liberate oxygen by heating the metal oxide particles to produce heated particles;
providing the heated mixed ionic-electronic conductive metal oxide particles to a re-oxidation reactor where the heated mixed ionic-electronic conductive metal oxide particles are exposed to a gas stream comprising an oxygen-containing gas thereby reoxidizing the mixed ionic-electronic conductive metal oxide particles in an exothermic reaction and transferring the heat of reaction to the gas stream to form a heated gas stream; and
providing the heated gas stream to a power generation system.

10. The method of claim 9, wherein the metal oxide particles are heated in the reduction reactor by concentrated sunlight.

11. The method of claim 9, further comprising:
recirculating the particles between the reduction reactor and the re-oxidation reactor.

12. The method of claim 9, wherein the metal oxide particles are preheated by the liberated oxygen prior to the metal oxide particles being provided to the reduction reactor.

13. The method of claim 9, wherein the heated metal oxide particles are stored in a reduced particle storage vessel prior to being provided to the re-oxidation reactor.

14. The method of claim 9, wherein the oxidized metal oxide particles are stored in a storage vessel after being re-oxidized in the re-oxidation reactor.

15. The method of claim 9, wherein the provided heated gas stream drives a turbine in the power generation system.

16. The method of claim 9, wherein the gas stream is first compressed by a compressor in the power generation system prior to the gas stream being provided to the re-oxidation reactor.

* * * * *